United States Patent Office
3,444,039
Patented May 13, 1969

3,444,039
FREEZABLE LIVE CELL DILUENT AND PROCESS
Ambrose Harry Jesudasan Rajamannan, Anoka, Minn.
(103 Landmark Drive, Eastern Heights, Ithaca, N.Y. 14850)
No Drawing. Filed Dec. 14, 1964, Ser. No. 418,304
Int. Cl. C12k 9/00; A01n 1/02
U.S. Cl. 195—1.8         18 Claims

ABSTRACT OF THE DISCLOSURE

This disclosure provides new and freezable diluent preservative material for live cells. The preservative material comprises dry and water soluble preparations of buffered polysaccharides, for example derivatives of partially hydrolyzed starches and essentially such water soluble buffered polysaccharides with or without modification, as including a water soluble extract of dried egg yolk solids therewith.

---

This invention relates to new and useful improvements in the art and method of preservation and freezing of live mammalian cell materials with partially hydrolyzed starches and essentially polysaccharides, and the products obtained thereby. More particularly, this new disclosure to the art concerns the provision of improved and more economical extender and preservative diluent material as freezable non-growth live cell preservative diluent, compounded in the critical relationship of an acidic solution of a mixture of predominantly carbohydrate polysaccharides and a buffering agent conditioning the mixture to a critical pH range of 6 to 7.5, and which contains over 80% carbohydrate polysaccharides exclusive of mono and disaccharides and inclusive of at least 30% mixture of Tri to Hepta saccharides, said mixture in solution, having an osmotic pressure in the critical range of 225 to 350 milliosmoles; including the combination therewith of a liquid extract from dry solids of egg yolk for mixing with such live cell and cell tissue matter as semen, germ plasma, bone marrow cells, muscle and artery tissue cells, and the like cell matters, which live cell matters are killed or damaged beyond practical use in the presence of the partially hydrolyzed vegetable starches constituting the high quantity polysaccharides when utilized without such conditioning, the method of preparing the said critically buffered preservative diluent material, and the combination therewith of such live cell materials.

The art has particularly been faced with the problem of cell damage in preservation and freezing in sugar, alcohol and other preservatives heretofore disclosed and known to the art. One of such prior disclosures is that found in Canadian Patent No. 682,906 issued Mar. 24, 1964. In such disclosure the problem of metabolism has led to the use of expensive and costly mediums which include primarily polyhydric alcohols of 4 to 7 carbon atoms, as sorbitol, mannitol, inositol, erythritol and the like. The prior art also includes the use of such materials as glucose, fructose, adonitol, and the like. In general, the fault with such materials is not only the cost factor, as there has remained the major problem of a decrease in healthy cells recovered after freezing. Even in the most expensive preservatives perfected, a high percentage of the cells recovered after freezing are injured and defective. It will thus be recognized that an alternative and new preservative diluent formulation of greater economy in manufacture and at the same time providing an improved recovery of live healthy cells would be of new advantage and is of need in the art.

Accordingly, it is the principle purpose of this disclosure to provide the art with improved preservative diluents which are economical to produce and by their use provides an improvement in the recovery of healthy live mammalian cells, including live tissue cell matter, after preservation by freezing in admixture with the diluents, as herein provided.

Another object of this disclosure is to provide a method of preparing the preservative diluents herein provided from a low cost mixture of naturally acidic carbohydrate polysaccharide material, of predominantly polysaccharides obtained by partial hydrolysis of naturally occurring vegetable starches and obtaining herewith an improved economical preservative diluent for live mammalian cells and which affords an improvement in recovery of healthy live sells after freezing.

In general, it may be stated that to obtain the new and useful objects and advantages of the method and preservative diluents herein provided comprises the preparation of a very mildly alkaline or buffered solution of an essentially normally acidic mixture of said carbohydrate polysaccharides material, as a mixture of partially converted hydrolysis products of naturally occurring starches of the vegetable kingdom, in the critical pH range of 6 to 7.5 and with an osmotic pressure between the critical range of 225 to 350 milliosmoles, in combination with an extract of a liquid fraction from spray dried egg yolk solids, and prepared in a temperature range of 2° C. to 37° C. This diluent and preservative is thereafter combined and used with the indicated live cell materials in a conventional manner. The preferred use of the prepared diluent, with added live cell matter, is in the freshly prepared freezable liquid form. However, the liquid portion of the prepared diluent may be evaporated, as by spray drying, or freeze drying, and the diluent solids later dissolved in water ready for extender and preservative use.

For the purpose of exemplification, the said mixtures of carbohydrate polysaccharides composition, in prepared form as preservative diluents, will be hereinafter illustrated by their advantageous use in the field of preserving animal bovine semen for insemination.

To the accomplishment of the foregoing and related ends, this improvement in the art therefore comprises the features hereinafter more fully described and particularly pointed out in the claims, the following description setting forth in detail certain illustrative embodiments provided in this disclosure, these being indicative, however, of the various ways in which the principles of this disclosure may be employed.

To illustrate by specific examples the following are provided:

EXAMPLE 1

| | |
|---|---:|
| Sodium citrate _____grams__ | 54 |
| Water _____cc.__ | 2,000 |
| Spray dried egg yolk _____grams__ | 100 |
| Partially hydrolized starch solids (grams per 1,000 cc. liquid extract) _____ | 5 |

The basic buffer solution of sodium citrate and water was prepared at slightly below normal room temperature. Then, the egg yolk material was dispersed in the prepared buffer solution. Upon mixing, a coagulum forms which is separable from the clear liquid by such conventional means as centrifuging, filtering or decanting. In this instance the mixture was allowed to stand until it had separated into two parts, (1) an upper coagulum fraction and (2) a lower clear liquid fraction. The lower clear fraction was extracted and to each 1,000 cc. clear fraction of extract was added 5 grams of partially hydrolyzed starch in the form of corn syrup solids and which are essentially over 80% polysaccharides. This constitutes a liquid diluent which is ready for use in a conventional manner, or in preparation for a live cell freezing process. If it is desired to freeze the solution of preservative diluent and live cell matter mixed therein, there is added about 5% to 10% glycerol by volume. The glycerol may be added before or after the mixture of live cell matter with the prepared liquid preservative diluent.

EXAMPLE 2

| | | |
|---|---|---|
| Alkaline citrate salt | grams | 27 |
| Water | cc | 1,000 |
| Egg yolk solids | grams | 50 |
| Corn syrup solids | do | 5 |

The above components may be merely added together and mixed. However, it is preferred to prepare the base buffering solution by mixing the alkaline citrate salt, as sodium or potassium citrate in the water and then add corn syrup solids and spray dried egg yolk solids followed by thorough mixing. After mixing, the mixture is allowed to stand until it has gradually separated into two fractions, as above indicated. The lower clear fraction is extracted and ready for use, with the desired amount of live cells added. The addition of the cell matter to an extender liquid, in any amount, for practical use is optional and known to the art. If it is desired to freeze the mixture of preservative diluent and cells, about 5% to 10% glycerol, by volume, is added.

The following illustration will show how some modification of the solids portion may be made:

EXAMPLE 3

| | | |
|---|---|---|
| Buffering agent to pH 6 to 7.5 and osmotic pressure | milliosmoles | 250–300 |
| Water | cc | 1,000 |
| Egg yolk solids | gms | 25–100 |
| Carbohydrate polysaccharides (defined) (preferably 2 to 15 gms. if no complementary sugar or alcohol is added) | gms | .5–15 |
| Fructose and/or glucose | gms | 0–2 |

The above components were mixed as in Example 2 including separation of the desired liquid extract. The extract may also be prepared in the manner of Example 1. The buffering agent, as utilized herein, may be any suitable salt or alkaline agent, or mixtures of the same. For example, such agents as citrates, acetates, phosphates, carbonates, and the like may be used to neutralize the otherwise acid sperm killing nature of the saccharides and effect the pH control, as described. The carbohydrate saccharides are a mixture of a minimum of mono and disaccharides with a maximum of tri, tetra, penta, hexa, hepta and higher polysaccharides. The products utilized herein are obtained by partial acid and/or partial enzymic hydrolysis of naturally occurring starches as obtained from corn, maize, potatoes, wheat, rice, tapioca, oats, and other plant and vegetable matter of the vegetable kingdom. The hydrolysis products are a partial conversion between 10% to 50% dextrose equivalent. This mixture of carbohydrate polysaccharides cannot be used without a soluble neutralizing or buffering agent as alkali metal citrates, phosphates, acetates or carbonates and mixtures of the same, or the like. An economical source of the carbohydrate saccharides is preferably those obtained by the partial hydrolysis of naturally occurring starches as found in maize, corn, molasses and the like syrup materials. The conventional sugar material is used to compliment the saccharides. However, such sugars and alcohols as heretofore known to the art are preferably entirely eliminated.

EXAMPLE 4

The process of Example 1 using sorghum syrup in the formula proportion of Example 2.

In the above formulations a faster wetting of mixtures with the dried egg yolk solids was noticed when the said partially hydrolyzed starch materials were added, in the stage of effecting extraction of the dried egg yolk solids. This did appear to measurably reduce the mixture time. In view of the relative similarity in production of partial hydrolysis of the vegetable starches, it is not believed to be necessary to further describe other formula and similar naturally occurring starches in the form of use as partially hydrolyzed starches and polysaccharides as herein described.

In the illustrative specific examples the relative percentages of solids are on the order of about 33% buffering agent, about 60% dried egg solids and about 6% saccharides solids. In general, the relative solids may vary on the order of 87% to 96% egg yolk solids to about 3.8% to about 13% carbohydrate polysaccharides, with the buffering agent present in an amount sufficient to effect a pH in the critical range value of 6 to 7.5 and the solution in water having an osmotic pressure in the critical range of 225 to 350 milliosmoles.

The preparation of preservative and extender mediums in combination with live cell materials is well known to the art and as described in the above mentioned patent. The particulars therefore, in preparing live cell mixtures of the herein described preservative diluent and extender are optional with regard to concentrations of cell matter and diluent, as is known to the particular field of use in preservation and extending of live mammalian cell matter. For the above tests the dilution was 1 part semen to 100 parts preservative and extender diluent, as is commonly used for insemination of bull semen. The application for insemination is otherwise of the same order as known to the art.

In tests of bovine semene in admixture with the herein described preservative diluent material, compared to like semen tests of a standard yolk citrate medium and another called "Minnesota Go," a popular sugar alcohol extender, the following results were obtained:

1. With Low Quality Semen Applicant's (Bovine)

| | 1. Std. Yolk Citrate | 2. "Minn. Go" | 3. Improved Diluent of Example 1 |
|---|---|---|---|
| Storage Ambient Temp | 1 day Viability | 2 day Viability | 2 day Viability. |
| Plus 5° C | 3 day Viability | 5 day Viability | 7 day Viability. |

2. High Quality Semen (Bovine)

| | | | |
|---|---|---|---|
| Storage Ambient Temp | 1 to 2 days | 3 days | 3 days. |
| Plus 5° C | 5 days | 7 days | 7 days. |

POST FREEZING SURVIVAL

3. High Quality Semen (Bovine)

| | | | |
|---|---|---|---|
| Before Freezing | 60% Motility | 60% Motility | 60% Motility. |
| Recovery After Freezing to Liquid Nitrogen Temp. | 30% Motility | 40% Motility | 55% Motility.* |

4. Low Quality Semen (Bovine)

| | | | |
|---|---|---|---|
| Before Freezing | 40% Motility | 40% Motility | 40% Motility. |
| Recovery After Freezing | 5% Motility | 20% Motility | 35% Motility.* |

*Progressive type of motility showing no sperm cell damage and an amazing increase in survival capacity.

The proof of the advantages which are gained by the herein described new and useful preservative diluent is illustrated from the post freezing survival pattern in low quality semen. Bulls of high performance (normally associated with low quality semen) can be utilized to a more beneficial extent since the freeze kill and cell damage is minimized. That is, the freeze kill has been reduced and a higher percentage of live cells are recovered, enabling a high quality semen producing bull to be used on a larger scale. Under the frozen semen program, the low quality semen producing bulls, many valued at $10,000 or more, would otherwise be discarded, with heretofore known and utilized semen preservative medium, despite high pedigree and performance. However, by use of my new preservative diluent compositions, such bulls can be saved and their semen used more productively.

In similar experimental tests with like diluted mixtures of frozen live cell matter, as the semen of cocks, studs, rabbits, pigs, dogs, rams and goats, with the carbohydrate saccharide medium herein provided, the recovered unfrozen mixtures, under microscope analysis, showed a comparable progressive type of motility with high activity and no appreciable cell damage.

Illustrative of a different application, a small sample of blood was taken and mixed with the prepared carbohydrate polysaccharide composition, minus the egg yolk extract, in the proportion of about 1 part blood to 2 parts of said composition. This mixture was frozen under liquid nitrogen temperature condition. Upon microscopic comparison of the unfrozen blood cells, with a new fresh sample from the same blood source, no visible cell damage was apparent. Inasmuch as the carbohydrate polysaccharide material may be a normal human food material, in its liquid state it may also be used as a preservative in the field of frozen blood for transfusion and frozen preservation of muscle, ligament and tissue cell matter, under suitable hygienic conditions and with or without a suitable antibiotic, as known to the art. To those skilled in the art, the equivalent and similarity of the preservative diluent for use with mammalian cell material will be recognized.

From the above description and subject matter of disclosure it will be apparent that some modifications as herein set forth may be made without departing from the spirit and scope thereof, as embodied in the terms of the following claims.

I claim:

1. In the process of preparing a freezable diluent for live cells the steps of preparing a water solution with an alkaline buffering agent, mixing dried egg yolk in the solution, effecting a separation of a solids portion and a clear liquid portion of said mixture, removing the clear liquid portion from said solids portion, retaining the clear liquid fraction and adding thereto the partially hydrolyzed products of naturally occurring starches consisting principally of over 80% polysaccharides of which over 30% consist of tri, tetra, penta, hexa and hepta saccharides.

2. The method of preparing a preservative diluent for live mammalian cells comprising preparing a water solution of dried egg yolk solids and a buffering agent, extracting the liquid from the solids, and adding from about 0.5 part to 15 parts water soluble carbohydrate polysaccharide material per about each 1000 cc. of water, the addition of said buffering agent in relationship to said polysaccharide material being added in an amount to effect a pH value of said solution in the range of 6 to 7.5 and an osmotic pressure of 225 to 350 milliosmoles.

3. The method of claim 2 wherein the proportion of said polysaccharide material is added between the range of 0.5 to 15 parts with a complementary sugar.

4. The method of preparing a freezable preservative diluent for live cells comprising preparing a water solution of a buffering material, dried egg yolk solids and a carbohydrate polysaccharide material, separating the solids from the liquid and retaining the separated liquid as the preservative medium having a pH value in the order of 6 to 7.5 and an osmotic pressure of 225 to 350 milliosmoles.

5. The product of claim 4 including live cells contained in a frozen state with said medium.

6. A freezable preservative and extender diluent for live cells comprising a mixture of a combination of water soluble carbohydrate polysaccharides and a buffering agent therefor, said mixture in a water solution having a pH value of 6 to 7.5 and an osmotic pressure of 225 to 350 milliosmoles.

7. The product of claim 6 containing a proteinaceous egg yolks.

8. The product of claim 6 including in combination therewith live mammalian cells in a frozen state.

9. A freezable preservative and extender diluent for live bovine sperm cells comprising a mixture of a water soluble extract from dried egg yolks, water soluble carbohydrate polysaccharide material, an alkaline buffering agent for said polysaccharide material, said mixture in a water solution having a pH value in the range of 6 to 7.5 and an osmotic pressure in the range of 225 to 350 milliosmoles.

10. The product of claim 9 wherein the said carbohydrate polysaccharide material is selected from the group consisting of the partially hydrolyzed end products of natural starches of the vegetable kingdom.

11. The product of claim 9 wherein the carbohydrate polysaccharides material is corn syrup material.

12. The product of claim 9 wherein the carbohydrate polysaccharide material is the partially hydrolyzed end product of corn starch.

13. The product of claim 12 including live mammalian cells contained with the said diluent in a frozen state.

14. An improved freezable preservative and extender diluent for live mammalian cells comprising a combination in the proportion of a water extract of about 25 to 100 parts dried egg yolk solids, about 0.5 to 15 parts water soluble carbohydrate polysaccharide material, and a buffering agent for said polysaccharide material providing a pH value in the range of 6 to 7.5 in a water solution.

15. The product of claim 14 including live mammalian cells.

16. The product of claim 14 wherein the carbohydrate polysaccharide material is selected from the group consisting of partially hydrolyzed natural starches obtained from the vegetable kingdom.

17. The product of claim 14 wherein the carbohydrate polysaccharide material is present in a proportion of about 0.5 to 15 parts in combination with up to about 2 parts complementary sugar.

18. A freezable preservative diluent for live cells containing a polysaccharide material comprising a partially hydrolyzed vegetable starch with a 10–50% dextrose equivalent and a buffering agent, said preservative in a water solution having a pH value of 6 to 7.5 and an osmotic pressure of 225 to 350 milliosmoles.

References Cited

UNITED STATES PATENTS

| 3,185,623 | 5/1965 | Smith et al. | 167—53 |
| 3,005,756 | 10/1961 | Van Demark et al. | 167—74 |

FOREIGN PATENTS

| 368,672 | 6/1961 | Japan. |

F. CACCIAPAGLIA, JR., *Primary Examiner.*

U.S. Cl. X.R.

62—1; 195—1.7